Jan. 23, 1940. W. J. MILLER 2,187,836

METHOD OF AND APPARATUS FOR MANUFACTURING POTTERY WARE

Filed Feb. 9, 1935 4 Sheets-Sheet 2

INVENTOR.
WILLIAM J. MILLER
BY George J. Croninger
ATTORNEY

Jan. 23, 1940.  W. J. MILLER  2,187,836
METHOD OF AND APPARATUS FOR MANUFACTURING POTTERY WARE
Filed Feb. 9, 1935   4 Sheets-Sheet 3

INVENTOR.
WILLIAM J. MILLER
BY George J. Groninger
ATTORNEY

Jan. 23, 1940. W. J. MILLER 2,187,836
METHOD OF AND APPARATUS FOR MANUFACTURING POTTERY WARE
Filed Feb. 9, 1935 4 Sheets-Sheet 4

INVENTOR.
BY WILLIAM J. MILLER
George J. Croninger
ATTORNEY.

Patented Jan. 23, 1940

2,187,836

UNITED STATES PATENT OFFICE 2,187,836

METHOD OF AND APPARATUS FOR MANUFACTURING POTTERY WARE

William J. Miller, Swissvale, Pa.

Application February 9, 1935, Serial No. 5,795

25 Claims. (Cl. 25—22)

This invention relates to methods and apparatus for the manufacture of pottery ware such as cups, saucers plates and the like known in the art as "dinnerware," from plastic adhesive clay as used in manual jiggering on a potter's wheel. It has to do with new and improved methods of ware production and improved high speed automatic ware fabricating apparatus which may be disposed in operative adjacency to a source of mold supply or storage such as a stove room, dryer, etc.

This application is a continuation in part as to all divisible subject matter of my co-pending applications for United States Letters Patent Serial No. 343,693, filed March 1, 1929; No. 573,017, filed November 4, 1931; No. 715,924, filed March 16, 1934 and No. 680,483 filed July 14th, 1933.

The objects are as will also be noted in my British Patent No. 471,589, to provide new and improved automatic ware fabricating methods and means which will displace the "jigger-man" or "potter" and "batter-out" in the normal jigger crew; to adapt automatic machine methods and apparatus for the fabrication of pottery ware in or on molds to manual mold handling between the apparatus and point or points of mold supply or storage, as for instance, a dryer, dryer conveyor, stove room, etc.; to automatically form and apply charges, and then automatically fabricate the same into ware in timed relation with means for automatically conveying the molds to and removing the molds from said clay feeding and fabricating means; to conserve an operator's time, effort and travel in servicing the apparatus; to insure compulsory observation of working parts whilst performing regular duties; to manufacture superior quality ware free from dirt, specks and drying cracks in the display surfaces thereof; to improve the forming and feeding of charges to the mold; to facilitate the removal of excess clay; to facilitate the making of small orders thru quick change facilities from one type of clay, mold or ware to another; and generally to improve die forming, jiggering and trimming methods and apparatus and provide a machine which may be operated in conjunction with a multiple of dryers or dryer conveyors and selectively moved from one dryer to another; to relieve large multiple line systems of expensive operation interruption in handling small orders; and in the automatic fabrication of ware to provide a new process and apparatus for forming a clay mass into ware ready for the dryer incident to the single operation of spreading the clay on a mold.

The ware fabricating apparatus of the present application may be installed in a drier and the molds automatically removed therefrom and returned thereto in accordance with the teachings of my Patent # 1,809,861.

According to the general system, ware is fabricated progressively in or on absorbent molds, the operations of forming and feeding charges, spreading the charge over the mold surface; adhesively bonding the clay to the mold, jiggering and trimming, all performed mechanically on automatic machinery. The molds are transported manually from a dryer and placed on a conveyor from which each is subsequently removed and automatically fed to the ware fabricating means and after fabrication the molds are automatically disposed on another conveyor and subsequently removed to a dryer.

Figure 1:
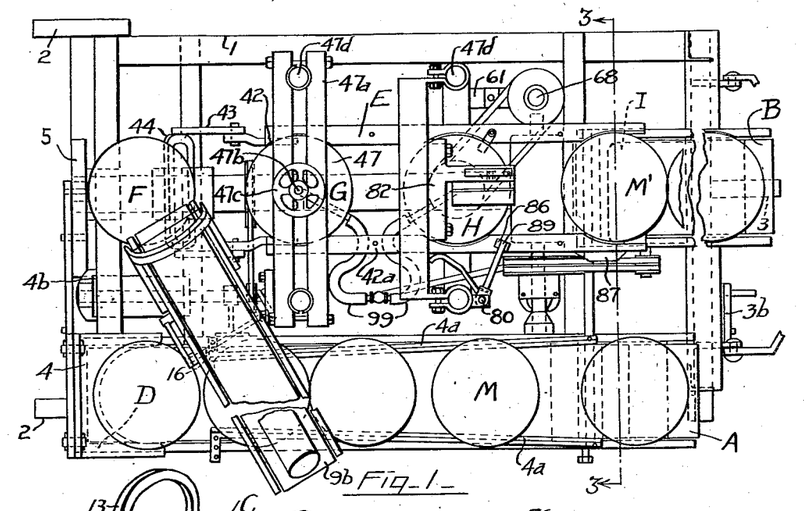
Figure 1 is a top plan view of the preferred form of apparatus.
Figures 2, 8A:
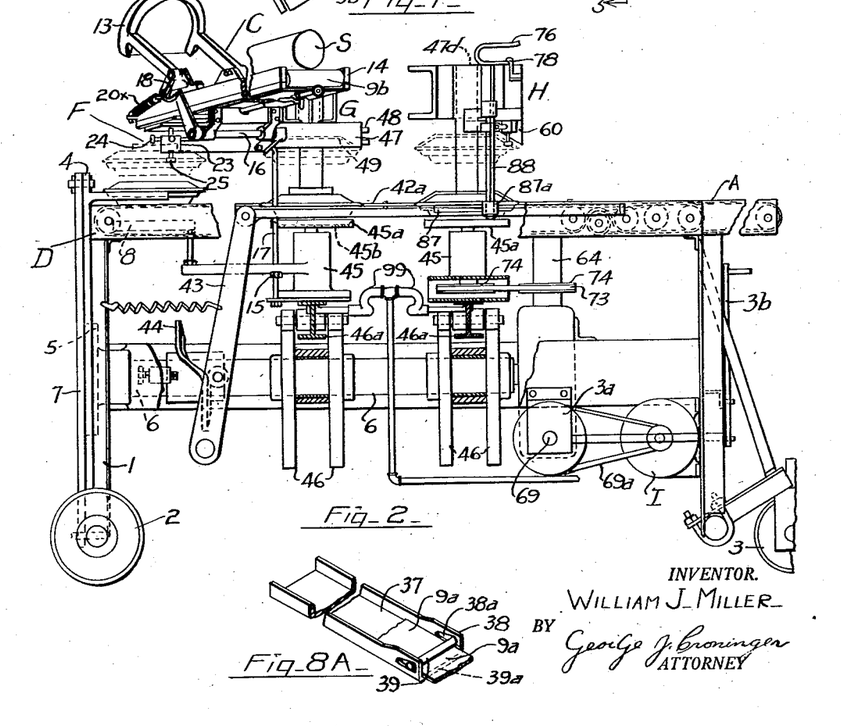
Fig. 2 is a side elevation partly in section thereof with certain of the parts broken away.
Fig. 8A is a detail in perspective of one of the feeder belt clutch devices.

The preferred apparatus, Figs. 1 and 2, comprises generally, a frame 1 having a three-point support on wheels 2, to avoid torsional stresses, one of which at 3 is swivelled to facilitate directional travel and placement adjacent a dryer. The frame supports drive motor I, a pair of elongated mold conveyors A and B respectively; a charge forming and feeding means C; a mold transfer D for automatically feeding empty molds from conveyor A to position F for charging; another transfer E progresses charged molds to and thru the die forming station G; profiling and trimming station H and onto conveyor B, both of said transfers operating in timed relation with each other and with conveyors A and B; the apparatus also including crossheads 46a and mounting chucks 8 and 45a for elevating the molds to operating position. The machine operates in repeated cycles and upon completion of each cycle a finished piece of ware in or on its mold is transferred to conveyor B, the molds accumulating thereon against the time when the operator will remove the same to the dryer.

Normally, the operator places a billet of clay on feeder belt 9 and manually advances it to correct cutting position and then loads the belt to capacity with reserve billets, welding the ends together. He then loads empty molds on conveyor A to capacity and clutches in the drive thru lever 3b and clutch 3a, whereupon empty molds are automatically transferred in consecutive order to and thru stations F, G and H, the operator continuing to place empty molds on conveyor A until filled molds appear on conveyor B, in sufficient numbers to require, in the operator's judgment, removal. The operator then removes these molds, normally two to four at one time to a dryer whilst machine production continues depleting the reserve of empty molds and increasing the collection of filled molds, however on the return trip from the dryer, he carries out empty molds, from which ware has been previously stripped to conveyor A to increase the number of reserve molds to insure continued productive operation of the machine whilst he again runs molds to the dryer.

Each manual mold handling cycle represents a period of time less than the maximum interval, which may be a variable, that the machine may continue to fabricate ware. A number of these mold handling cycles may occur in succession and then the operator may drop a cycle at a regular or irregular interval to apply a clay slug to the feeder, remove scrap clay or perform other normal duties and thereafter progressively increase the number of empty molds on conveyor A and decrease the number of filled molds on B to normal over a subsequent succession of manual mold handling cycles all whilst the machine continues in production.

When conveyor A moves left a predetermined distance, the brim of the lead mold M is centered automatically on frame 4 of transfer D, the conveyor travelling a distance greater than the mold diameter before stopping to close the gaps between the molds and insure seating of the next succeeding mold on frame 4 upon subsequent advance of the conveyor. The provision of guides 4a and a flat upper run enables the random placement of molds not necessarily in touching relation on the conveyor and conserve the operator's time.

Figures 3, 4, 5, 6:
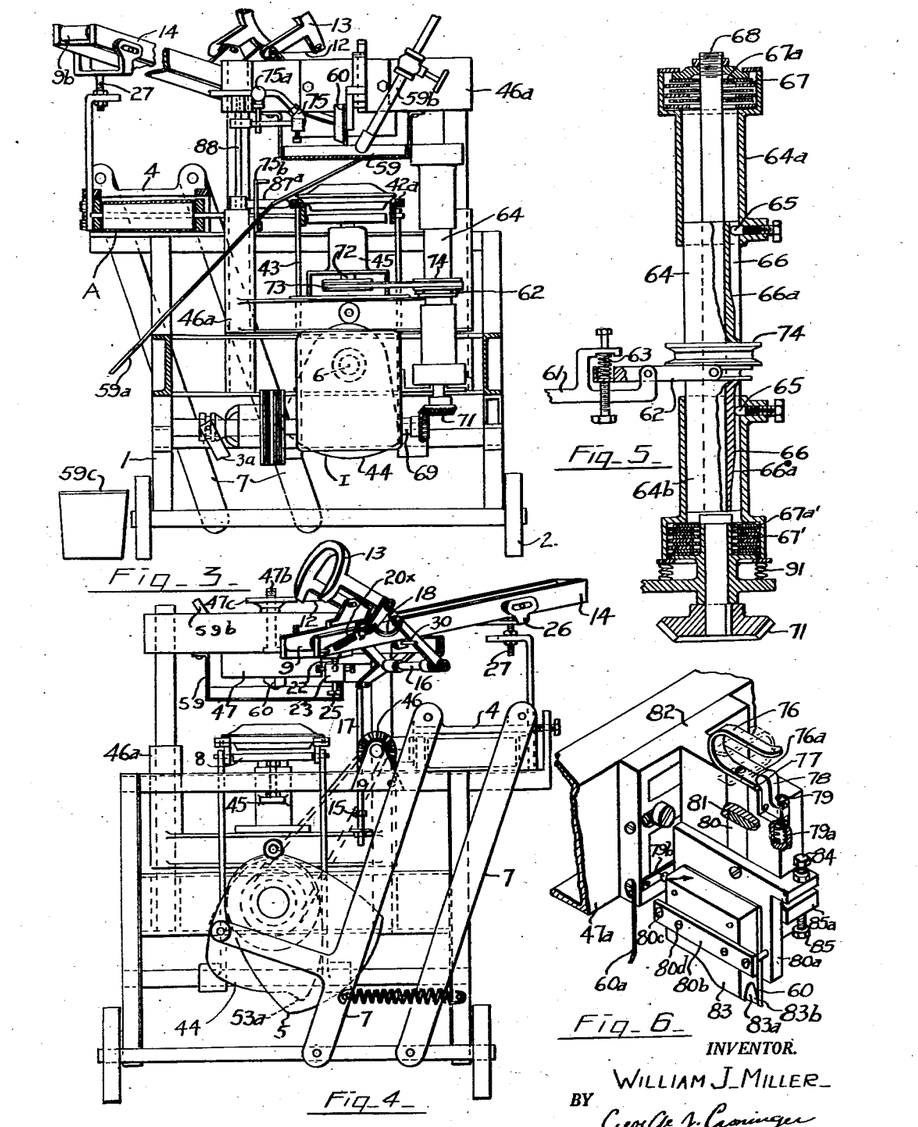
Fig. 3 is a sectional elevation of apparatus of Fig. 1 taken on line 3—3 of Fig. 1.
Fig. 4 is a right end elevation of apparatus of Fig. 1.
Fig. 5 is a detail in section of jigger chuck drive unit.
Fig. 6 is a detail in perspective of demountable profile unit.

The frame 4 is shifted to left, Fig. 4, by cam 5 on drive shaft 6 thru parallel levers 7 to automatically transfer a mold from conveyor A to centered position over ring chuck 8, Fig. 2, the bottom of the mold being cleaned during transit by revolving brush 4b. The chuck is then elevated thru cam 46, crosshead 46a, and engages the mold thru the open bottom of frame 4, elevating it to charging position adjacent the lead end of feeder belt 9 (see dotted lines, Fig. 2) whilst frame 4 is returned to its initial position.

Figures 8, 9, 10, 11, 12, 13:
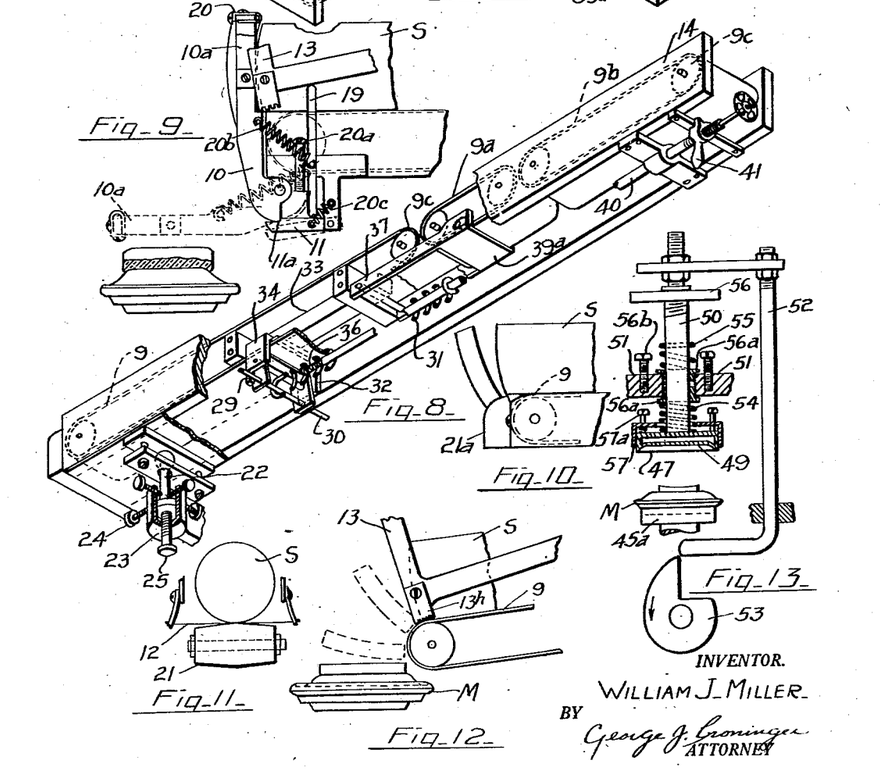
Fig. 8 is a detail in perspective of a feeder.
Fig. 9 is an elevation of charge transfer.
Figs. 10, 11, 12 and 12A disclose substitute arrangements for applying charges to molds.
Fig. 13 is an elevation, partly in section, of a reciprocable die and associated mechanism.

Meanwhile, the convex lead end of cylindrical clay billet S has been progressed by intermittently operated belt 9 preferably into a charge seat 10a, Fig. 9, in pivoted transfer member 10, locked in substantially vertical position by a spring retained dog 11, the extent of billet advance determining the thickness and bulk of the charge. Springs 20 lightly engaging the billet periphery insure charge retention during transfer.

The preferred billet form is that of a relatively large diameter elongate cylinder having mitered ends which represents a maximum volume for a minimum peripheral surface area. By severing slices from the lead end of the slug, a disc like charge is produced, having a maximum area of clean clay and a minimum exposed area (in the periphery) of contamination. This contamination usually whensoever it occurs, is in the form of microscopic iron particles that are detached from the surfaces of the knives, screw and pug nozzle by the highly abrasive action of the clay and are normally deposited in the billet skin. If this skin is laid against the mold face or if the clay is masticated during charge formation, the particles are scattered throughout the ware and upon firing become visible as "off color" specks in the display surfaces. My improved method confines contamination to the ware brim zone, generally removed by the trimmer or at least covered by decorations.

A clay slice of measured thickness is then severed on the bias in overbalanced position by adjustable cutting wire 12 which may be heated, dried or wiped of adhering clay as hereinafter described, to reduce its cut sealing characteristics and insure free drop of the slice. The wire is preferably oscillated in a predetermined substantially rectilinear path (see diagram, Fig. 15) by frame 13 having a shifting pivot in elongated bearings 12a attached to feeder frame 14, and connected to an actuating crank 16, Fig. 4, by elastic members 18. This crank is operated in unison with crosshead 46a, the position and extent of reciprocation being determined by the adjustment of nuts 15 on connecting rod 17.

When pin 19, Fig. 9, is depressed at the end of cutter frame stroke, pawl 11 is disengaged from abutment 11a, releasing the over-balanced transfer ring 10 which pivots against adjustable stop 20a (see dotted position) centering the charge in a predetermined substantially horizontal position over the mold. The slice is released from springs 20 by its momentum for a short drop to the central zone of the mold surface and there flattens radially due to its convexed engaging face, to avoid air entrapment. Balance spring 20b returns empty transfer to latched position, subsequent to the forward shift of frame 13 by spring 20x moving the cutting wire from a to b (see Fig. 15) and away from the billet end to avoid contact with the end of the billet and consequent clay accumulation on the wire upon rise from b to c and horizontal travel from c to d, to initial position. As frame 13 rises, spring 20c returns dog 11 to latched position and elevates trip pin 19.

Figure 14:
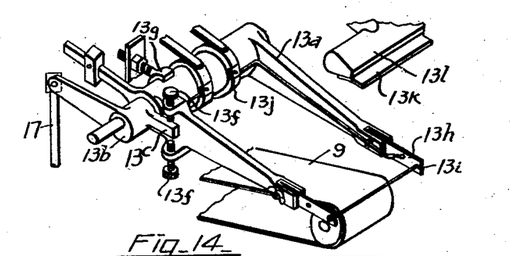
Fig. 14 is a detail in perspective of a modified form of charge segregating apparatus and Fig. 15, a motion diagram of the cutting wire stroke.
Figure 15:
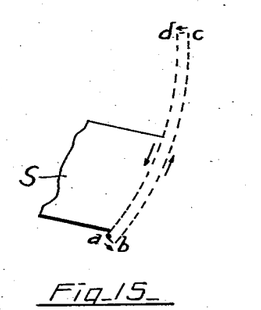

In the modification of Fig. 14, the cutter frame 13a is pivoted on an eccentric sleeve 13b oscillated by rod 17 to alternately move abutment 13c into frame elevating or lowering engagement with adjustable screws 13f, causing the cutting wire to traverse the arcuate path from d to a and b to c, Fig. 15. At the termination of the downstroke or upstroke, the frame is held against rotation by friction drag 13g whilst the abutment 13c travels between screws 13f, and the frame is moved radially shifting the wire from a to b or c to d according to the position of the frame. The sides of the motion parallelogram of Fig. 15 may be varied by screws 13f to increase or decrease the horizontal and vertical travel of the wire. The wire may be additionally adjusted relative to the platen by movable mounting members 13h, Fig. 14, notched at 13i. In Fig. 9, the mounting members tension the wire which is of predetermined length and solder tipped for quick mounting and interchange in notches. In Fig. 14, the wire may be continuously or intermittently electrically heated according to the type of ring contact 13j employed to dry the same after adhering clay is removed by stationary canvas wiper 13k. Hot air may also be directed against the wire by nozzle 13l.

It is quite important that the wire be devoid of adhering clay lest this sticky accumulation close the cut during severing, usually by creating a vacuum behind the wire that tends to reseal the cut and prevent free fall of the slice, the aforesaid methods relieving the operator of constant observation.

Figure 12A:
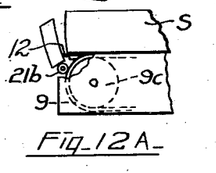

By severing charges on the center of a crowned roller 21 as in Fig. 12 and in overbalanced position directly against the belt, the slice may be guided directly onto the mold according to the dotted line disclosure with the farther rim portion of the slice face first engaging the mold. In Figure 10, the arcuate surface of stationary platen 21a, which may be lubricated, guides the fall of the slice. The slice may also be severed on a rotatable platen 21b, Fig. 12A, to insure reliable gravitation.

The feeder frame is vertically and adjustably supported at the rear by slotted yoke 26, Fig. 4, on vertically adjustable stud 27 and vertically at its forward end by stud 22, Fig. 8, seated on screw 25, and positioned horizontally by radial screws 24, in cup 23, attached to the machine frame.

Figure 17:
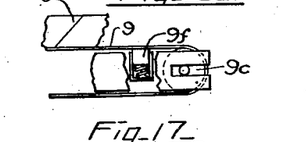
Fig. 17 is a fragmentary detail of the feeder belt lubricating means.

The adjustable inclined position of the frame insures predetermined gravitation of reserve billets on idler belt 9b for collision with and welding on the bias to the tail of preceding billets on driven belts 9 and 9a and reduces power required to advance billets and increase the gravity pull on the slice to insure its parting from the slug during cutting and reduces its angle change of position during drop to mold. These belts are mounted on spaced, adjustable idle rollers 9c, having slightly concave surfaces to avoid slug distortion and are supported between rollers by slightly concave metal troughs 9e. Belt lubrication is by spring pressed graphite blocks 9f mounted in feeder frame, Fig. 17.

When rod 30, Figs. 4 and 8, resting against stops 29, is released by initial movement to right of crank 16, a spring 31, connected to tube 40, shifts rod 30 to right, tilting U-shaped lever 32, pivoted in bracket 34 and pinches the belt 9 therebetween, whereupon, the clutch assembly secured to and guided by square rod 33 is advanced by spring 31 to right and drags belt 9 until rod 30 engages adjustable rod stop 36. This adjustment determines the length of billet advance and the thickness of the slice next to be severed. The tension in spring 31 is adjusted thru threaded engagement of tube 40 with latch 41. To avoid parting of the billets at the weld, belt 9a is driven in unison with 9 by auxiliary roller clutch having frame 37, Fig. 8A, connected to rod 33 and having elongated taper slots 38a in each terminal 38 with loose fitting necked roller 39 for binding the belt against web 39a when shifted to right. This also permits the free forward travel of belt 9a either manually or by gravity to abut succeeding billets. Feeding may be discontinued by releasing the latch 41, Fig. 8, and the billet advanced manually to correct position by reciprocating the tube 40. Both clutches are idly retracted upon engagement of rod 30 by crank 16 thus "tensioning" spring 31 for succeeding advance of belt.

After the mold is charged at F and lowered onto the end seat 42 of transfer E, the transfer is shifted to right, Figs. 1 and 2, by levers 43, and cam 44 on the shaft 6 to advance the mold to the blank forming station G. The transfer may be quickly adjusted to accommodate molds of other size by removing the dowelled bars 42a and substituting bars having mold seat portions of correct size. Chuck 45a on stand 45 is then elevated by peak cams 46 and crosshead 46a, lifting the mold into co-operation with a stationary die 47, which engages, progressively spreads and adhesively bonds the clay to the mold. The charge preferably is in the form of a disc and lies in centered or approximately centered position on the mold covering only a portion of the ware forming surface; upon engagement with the die, the material is spread radially and evenly until the ware surface is completely covered, the contaminated slice brim flowing to the mold brim and subsequently being trimmed or cracking off during drying.

As distinguished over manual, wherein the clay is first "batted out" into a pancake oversize as to the diameter and thickness of the completed ware, independently of the mold on which it is formed and then applied thereto; the clay charge is deposited directly on the mold as it is severed from the parent mass and is then spread or diffused over the ware forming surface of the mold (by a die which in effect is a batting out head) to fully cover the same, thus eliminating the normal batting out procedure and considerably shortening the period necessary for completion of the piece. In effect, this amounts to "batting out" directly on the mold but without the abnormal excess of the manual routine, or the additional procedural steps.

In addition to this, the application of force in spreading and applying the clay over the exposed surface of the mold provides a mechanical bond of increased efficiency both as regards capillarity and resistance to dislodgement under the higher speeds of mold rotation common to automatic equipment of this type.

The die 47 is demountably supported and positioned on lintel 47a bolted to crosshead guide 47d by central boss screw 47b and handwheel 47c for quick interchange. Heated fluid is conducted thru fluid connections 48 for heating the contoured face 49 of the die to vapourize a portion of the fluid in the clay to insure reliable release of the clay from the die face and insure adhesion to the mold, substantially as shown and described in my co-pending application Serial No. 715,924. A die having very minute pores may be substituted therefor and a constant flow of compressed air or steam head maintained thru the pores, to provide a constant fluid film between the blank and/or the ware and die during pressing that resiliently repels the clay and insures reliable adhesion to the mold. The chucks 45a have intermittently sealed apertures in their bases at 45b for the automatic elimination of dry clay chips that ordinarily tend to prevent proper seating of the molds and consequent breakage under unequal strain developed under pressure.

The clay charge is conformed and secured to the mold with a minimum dwell of the hot die, due to sharp rise and fall of cam face at 53a, Fig. 4, to prevent detrimental cracking or case hardening of the blank and/or ware surface from too rapid drying and shrinking effect of heat. Suction is applied to the chucks thru flexible conduits 99 and controlled by cam operated valves (disclosed in my co-pending application Serial No. 573,017) at proper intervals to secure the mold to the chuck and assist in releasing the clay from the die. Scale may be removed from the die surface by a blower (not shown) and scraped from the ware surface by profile 60.

Fig. 13 discloses an alternate form of blank and/or ware forming apparatus which may replace the stationary die if desired. This apparatus comprises a die 47 mounted for elevation with stem 50 by link 52 and snail cam 53. After mold M is elevated into forming position, compressed spring 54 instantaneously depresses the die to spread and conform the charge to the mold, the thickness of the bat and/or ware being determined by adjustment of screw stops 56b co-operating with adjustable collar 56. The die is instantly partially retracted with no appreciable dwell by rebound spring 55, compressed by adjustable collar 56 and thereafter completely elevated by snail cam 53. Springs 54 and 55 are adjustable for tension by bushings 56a in the member 51. Reliable release of clay is insured by either type of die mentioned and absence of a dwell avoids cracking or scaling of ware from the hot die previously regulated.

The character of the ware thus produced is such that further treatment as by a profile is optional, albeit the ware may be reformed and/or embellished by co-operation with a die at a subsequent station either before or during drying. The rim of the ware may be defined and trimmed incident to die forming by a spring pressed heated ring 57 mounted for delayed action after the die descent has been arrested, thereby indenting the periphery of the ware to a predetermined depth as determined by screws 57a, the excess material cracking off during drying. Trimming or retrimming of the ware brim by a ring may occur at H, if desired, independent of a hot die or by a blade trimmer. Excess material from the profile and/or trimmer blades is discarded into a pan 59, Fig. 3, and/or inclined chute 59a preferably lubricated by fluid spray from adjustable nozzle 59b, leading to the scrap container 59c.

Accordingly, ware fabrication as simplified by this apparatus would include the forming and feeding of charges as described and subsequent die spreading and formation, the ware being either then placed in a dryer or additionally finished prior and/or subsequent thereto. The system can be operated in conjunction with the manual transportation of molds to and from the dryer or may be operated in conjunction with a dryer and continuous conveyor either with or without additional finishing steps after die formation.

Normally, after pressing, with a stationary die, the exposed surface of the blank is finished as by profiling and in the order of the procedural steps, the mold is lowered and centered by its brim in the center seat of retracted transfer E, shifted to H and elevated by chuck 45a at H for co-operation with the profile 60, a drive for rotation of the mold being automatically clutched in as the mold clears the transfer E by a bracket 61, Figs. 1 and 5, on crosshead 46a and a fork 62 having a yieldable and adjustable connection 63, Fig. 5, to insure progressive application of and prevent premature disconnection of the drive during slow break away or drop of mold. As the fork 62 is elevated, sleeve 64 rises, until detent 65 engages the slant portion 66a of spline 66, raising the sleeve 64a and engaging alternate discs 67 on sleeve 64a with mating discs 67a on the driving shaft 68 rotated by shaft 69, Fig. 3, belt driven at 69a, Fig. 2, from motor I and bevel gears 71 to rotate the jigger chuck spindle 72 thru belt 73 and pulleys 74.

In practice, mold M is rapidly elevated substantially until the profile tool contacts with the blank, then rotated, then slowly elevated while removing the surplus clay, while water or steam is automatically applied to the ware surface before and during the profiling operation upon rise of crosshead 46a, under control of valve 75a actuated by cam 75b, thru nozzle 75, Fig. 3, preferably at low velocity and small drop size to avoid pitting of the ware surface.

Excess pressures on the profile tool are relieved by part or complete yielding of tapered face 77 of detent 78 on terminal 76a of handle 76. The yield point of detent 78 is adjustable thru screw 79 on spring 79a. The tool assembly is mounted on a dovetail guide bar 80 snugly fitting in a dovetail slot 81 in bracket 82 adjustably attached to lintel 47a. The taper face 77 permits limited vertical travel of the tool for adjustment purposes without materially affecting anti-release pressure on the detent which also presses the top of bar 80 tangentially in co-operation with pressure of spring 79b acting on lower end of assembly to absorb any lost motion in V groove and preload the tool with pressure in the same direction (indicated by arrow) as applied by the clay to avoid shifting of profile after placement. The assembly is quickly removed by turning the handle 76 forty-five degrees to clear the latch and raising, thus facilitating the quick interchange of tools from one machine to another or replacement with tool previously "set" in a master jig, thus conserving operator's time.

Base 80a is secured to bar 80 and tool 60 is adjustably held against base by clamp 80b thru screws 80c, the grooved backing block 83 may or may not be secured to clamp 80b by screws 80d. There being no screw holes in the tool, it may be adjusted down to compensate for material lost during re-sharpening. Screw 84 is adjusted on dummy set up to determine correct lowermost position of the profile tool, which determines the thickness of the ware, and when installed, seats on adjustment screw 85 in abutment 85a on bracket 82. Screw 85 adjusts height of profile above chuck and is re-adjusted to compensate for wear on parts, or if a multiple of machines are used, the height may be standardized on all machines for selective interchange of tools without further adjustment.

Substantially at the termination of the profiling operation, the trimming tool is moved substantially horizontally into and out of engagement with the ware brim by the transfer E when abutment 87 on transfer E, Figs. 1 and 2, engages the lever 87a on shaft 88, supported by lintel 47a. Adjustable trimmer blade 86, Fig. 1, is resiliently carried by the trimmer bar 89 and is inclined to divert clay trimmings into chute 59a or pan 59, the peripheral speed of the mold being adequate to propel the excess clay thereto. A wire trimmer 60a, Fig. 6, adjustably positioned radially and circumferentially on bracket 82, removes projecting clay from the mold brim and diverts it into chute 59a.

Figures 16, 20:
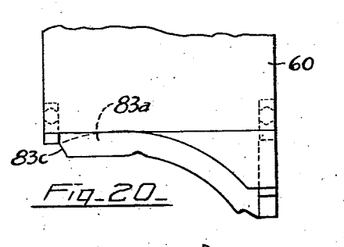
Fig. 16 is an end view of the feeder belt and concave supporting guide.
Fig. 20 is a front elevation of a profile tool.
Figure 18:
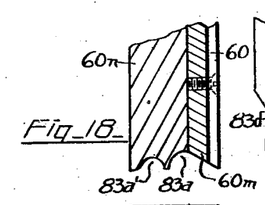
Fig. 18 is a vertical section of a multiple groove profile.
Figure 19:
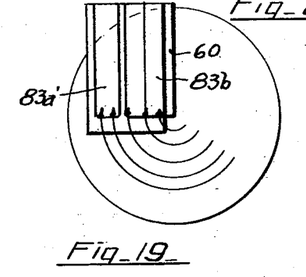
Fig. 19 is a bottom plan view of the tool of Figure 18 with imaginary lines indicating the directional travel of the excess clay.
Figure 21:
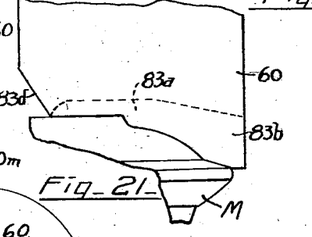
Fig. 21 is a detail of another form of profile.
Figure 22:
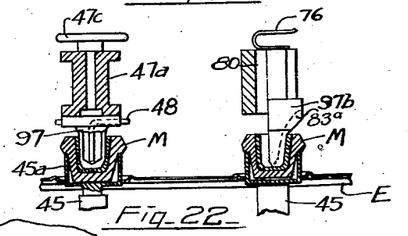
Fig. 22 is a detail in section of substitute instrumentalities for making hollow ware.

The tool assembly of Fig. 6 is provided with an extruding groove 83a, located in block 83, contiguous with profile blade 60 and flaring toward the outlet 83b, Figs. 20, 21 and 22, to insure directional movement and discharge of excess clay at the brim of the mold, preferably into chute 59a. The groove 83a, Figs. 6 and 20, is preferably open at the inner end 83c to receive clay travelling in a tight circle at the axis of the mold (as illustrated by the arrows in Fig. 19) that would otherwise pile up against the square end of a conventional solid tool. Although the groove does not open thru the inner edge of the tool of Fig. 20, the inclined portion 83d directs the clay under the edge and into the groove therebehind. The tool of Figs. 18 and 19 is formed with a multiple of grooves 83a' and 83b varying as to width, the outer groove acting as an emergency or auxiliary conduit to the inner groove and due to its tangential position provides a greater extrusive characteristic. This tool comprises a blade 60 and backing 60m cemented thereto and joined to the block 60n. One wall of groove 83a is formed by the contiguous lower edges of the block and backing to facilitate filing the tool.

At the termination of the profiling and trimming operation, the ware and mold are lowered onto right end seat of the retracted transfer E, and, as the chuck descends, sleeve 64B, Fig. 5, is lowered, discontinuing the jigger chuck drive and as the slant portion 66a of lower spline 66 engages lower detent 65, sleeve 64b is depressed, thereby frictionally engaging the rotating discs 67' with discs 67a' on stationary bushing 90 and stopping rotation of the jigger spindle. Springs 91 counterbalance the sleeve 64b when disengaged.

Figure 7:
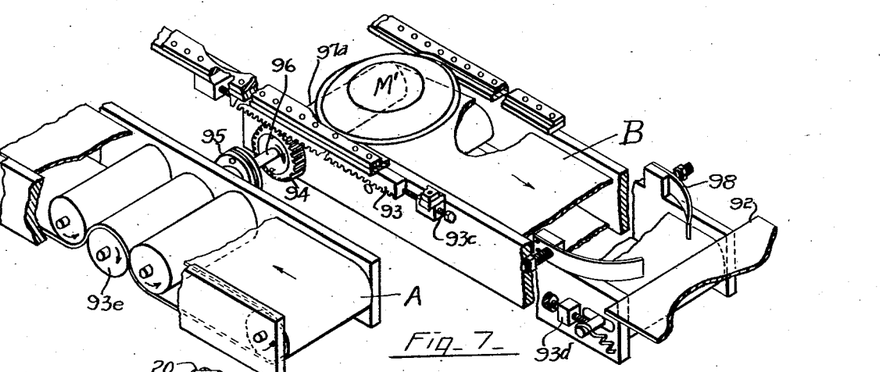
Fig. 7 is a detail in perspective of a conveyor system.

Transfer E is then shifted to the right, transferring the mold onto intermittently advancing conveyor B, actuated by rack 93, Fig. 7, gear 94 and one way clutch 95 on shaft 96, keyed to roller 97a. Gaps between the molds are closed by adjustable spring pressed stops 98 set to permit capacity accumulation before yielding to permit molds to travel onto reserve shelf 92. The molds are transferred from this conveyor, as described, to a dryer and the ware subjected to an atmosphere of controlled temperature and humidity for a period necessary to dry the same. The operator returns empty molds to conveyor A, driven intermittently and in unison with conveyor B by pulley 93e keyed on shaft 96. Linear travel of each conveyor is adjustable thru set screws 93c to accommodate various diameter molds and screw stops 93d and floating rollers enable selective tensioning of any one of the conveyor or feeder belts.

Cups or holloware may be made on the machine by mounting a heated or porous male die 97, Fig. 24, on lintel 47a at G and an extruding male profile 97b in holder 80. Substantially the same process is followed in producing the ware as hereinbefore related.

In adapting the machine to use with a dryer, transfer E may transfer empty molds directly from a chain conveyor, as in my Patent No. 1,809,861 directly to ring chuck 8 and filled molds M' may be replaced on the conveyor by transfer E or intermediate automatic mold handling equipment may be employed between the conveyor and the transfers.

By installing and operating these instrumentalities in multiple, a multiple of production lines may be established.

Wherever in the claims, the expression "on molds" shall occur, with regard to the fabrication of ware, it shall be interpreted as meaning "in or on" by virtue of the disclosure of both cup and plate type molds.

I claim:

1. A jiggering machine having, in combination, a mold charging means, a support arranged in registration with the means, a mold conveyor, an intermittently operating means for moving molds from said conveyor to said support, means for elevating said support, and means operating in timed relation with the elevation of said support for severing and gravitating a charge onto said mold incident to the elevation thereof.

2. In a jiggering machine, in combination, a conveyor, a die, a support arranged in registration with said die, an intermittently operating member for moving molds from said conveyor into registration with said die and support, means for elevating said mold and support into co-operation with said die, jiggering means for subsequent co-operation with said mold and a conveyor for the reception of molds after co-operation with said jiggering means.

3. In a jiggering machine, in combination, an intermittently movable carrier for molds, charge feeding mechanism and a die, and a jigger for operating on material carried by said molds, means for applying molds to said carrier and removing molds therefrom, means for elevating molds into co-operation with said charge feeding means, said die and said jigger and a conveyor on which empty molds are accumulated prior to being transferred to said intermittently movable carrier.

4. In a jiggering machine the combination of an intermittently movable mold carrier, charge forming and feeding mechanism comprising an intermittently movable belt for the reception of a clay billet and means for slicing charges therefrom, a die and a jigger for operating on the material carried by said molds, means for elevating said molds into co-operation with said charge forming and feeding mechanism incident to the severing of a charge, means for elevating said molds with material thereon into co-operation with said die, means for elevating said molds with material thereon into co-operation with said jigger, means for heating said clay incident to co-operation with said die and jigger, means for automatically removing excess clay incident to jiggering and means for removing molds from said jigger and placing the same on a conveyor from which molds are transferred to a dryer and there dried in an atmosphere of controlled humidity.

5. In a jiggering machine, in combination, means on which empty molds are accumulated, a mold charging apparatus, means for feeding empty molds to said charging apparatus, a spreading means for applying clay to said molds, means for heating said applying means to insure retention of the clay by the molds, jiggering means and means for accumulating filled molds.

6. In a jiggering machine, the combination of means for forming and depositing clay charges on molds, a conveyor on which empty molds are accumulated in unpredetermined spaced relation and in single file, transfer means for feeding molds from said accumulating means to said charge forming means, a pressing means for spreading the clay over and applying clay to said molds, jiggering means, a mold conveying means for transporting molds between said feeding means and said jiggering means and means for accumulating filled molds from which molds are manually removed and manually transported to a drying zone.

7. A machine for manufacturing dinnerware on absorbent molds which comprises, in combination, a frame, a reciprocal transfer for molds, a charge forming and feeding mechanism superimposed relative to said transfer, pressing means mounted on said frame, means for elevating molds for co-operation with the charge forming and feeding mechanism and the pressing means, and a conveyor for the reception of empty molds together with means for transferring molds from said conveyor to said reciprocal transfer and a conveyor for receiving filled molds delivered thereto by said reciprocal transfer.

8. A machine for manufacturing dinnerware on absorbent molds which comprises, a frame, a charge forming and feeding mechanism mounted thereon, a conveyor for empty molds, a single seat transfer for advancing empty molds from said conveyor to said charge forming and feeding mechanism, pressing means mounted on said frame, a multiple seat reciprocal transfer for advancing molds from said charge forming and feeding mechanism to said pressing means and conveying means on which filled molds are accumulated means for actuating the conveyors for empty and filled molds in timed relation with said reciprocal transfers.

9. In a jiggering machine, in combination, a mold support, means for slicing charges of clay from preformed clay billets, means for adjustably locating the slicing means relative to the mold support, means for pressing the clay against the mold to spread and bond the same thereto, means for jiggering the clay, and a pair of synchronized conveyors operating in timed relation with said slicing means and on which molds are accumulated.

10. In apparatus for the manufacture of potteryware on molds, means for forming clay charges in suspension for gravitation onto said molds, pressing means for spreading the clay over the surface of the molds and adhesively bonding the same thereto, means for preventing separation of the molds and clay, a mold transfer and means on which filled and empty molds are accumulated.

11. In a jiggering machine for fabricating ware on absorbent molds, the combination which comprises, a means for feeding preformed billets of clay toward a point of severance, means for severing slices of clay from said billet, said slices being gravitated onto the central zone of said molds, means for spreading the clay radially in contact with the surface of the mold and for bonding the same thereto, means for jiggering the clay and means for trimming the clay in the zone of the mold brim.

12. A system for the manufacture of formed dried pottery ware on absorbent molds from plastic clay which comprises manually transporting empty molds from a dryer to a zone of mold accumulation and manually accumulating a reserve supply of empty molds, automatically removing accumulated molds one at a time from the accumulated reserve supply, automatically filling the molds with clay and then automatically accumulating the filled molds for manual removal from the zone of filled mold accumulation and manual return to the dryer.

13. In apparatus for the manufacture of pottery ware on molds, the combination of a means for charging molds with clay, a means for batting out the clay on the mold, mechanism periodically operable to convey a mold to said charging apparatus and batting out means, and individual endless conveying means on which empty and filled molds respectively are accumulated in aligned position.

14. In apparatus for the manufacture of pottery ware on molds, the combination with a mold charging means of means cooperable with the mold for operating on a charge of clay on the mold to form a blank adhesively bonded to the mold, means for operating on the bat to form the same into ware, means on which empty molds are accumulated, a mold chuck operating below the mold charging means, a mold transfer for transporting molds from the empty mold accumulating means to the chuck, means for elevating the chuck to support a mold off the mold transfer whilst the transfer is moved relative thereto, and means for reciprocating said transfer.

15. In a jiggering machine, a conveyor adapted to receive an elongated billet of clay, means for cutting off a charge of material from the said billet, a mold adapted to receive said severed charge directly upon cutting off, mechanism for batting out said charge directly on said mold to spread the same over the ware forming surface and bond the same thereto, a jiggering tool, means for co-operating said mold with material thereon with said jiggering tool, an elongated conveyor having a horizontal unobstructed upper run on which empty molds are accumulated by hand, means for periodically removing molds therefrom and moving the same into operative adjacency to said charge feeding apparatus, and a conveyor on which filled molds are automatically accumulated and from which filled molds are manually removed.

16. In a jiggering machine, a charge feeding apparatus comprising a conveyor and means to periodically move the conveyor to advance a billet of clay a desired amount, cutting mechanism operable to sever a predetermined portion of the material, a mold adapted to receive the material directly upon severance, a press means for batting out the material directly on the mold, a jiggering means, means for co-operating said mold with material thereon with said jiggering means, means for applying fluid to said material incident to jiggering, means for removing excess material produced incident to jiggering, means for periodically transporting molds in consecutive order to said charging means, said batting out means and said jiggering means and means on which empty molds are accumulated by hand and on which filled molds are automatically accumulated for removal to a drying zone by hand.

17. In a jiggering machine, the combination with a charge feeding apparatus of a charge severing means associated therewith, a mold lifter disposed directly below said charge feeding apparatus for supporting a mold adapted to receive the charge upon severance, a batting out head for batting out the clay directly on the mold, a jigger, a mold transferring means for advancing molds from said charging means to said batting out head and to said jigger, means for elevating said molds off the mold transferring means whilst the transfer is moved relative thereto and the molds are moved into co-operation with said batting out head and said jigger, a conveyor on which empty molds are accumulated in multiple, means for periodically moving molds from said conveyor to said support and an elongated conveyor having a horizontal upper run on which filled molds are accumulated for subsequent removal to a dryer.

18. In a jiggering machine, a plurality of elevatable mold chucks, an automatic charge feeding apparatus adjacent one of said chucks, a press means associated with another of said chucks and a jigger associated with the other of said chucks said jigger comprising a profile blade and support therefore demountable as a unit and releasable in response to overload pressures, a multiple seat mold transfer arranged adjacent said chucks and adapted to advance molds stepwise therebetween, a periodically operating mold transfer located adjacent one end of said multiple seat transfer, a mold conveyor associated with the other end of said multiple seat transfer and a mold conveyor associated with said periodically operated mold transfer.

19. In a jiggering machine, a plurality of mold chucks, an automatic charge feeding apparatus adjacent one of said chucks, a press means associated with another of said chucks and a jigger associated with the other of said chucks, cam means for elevating said chucks, means for rotating the jigger chuck incident to elevation a multiple seat mold transfer arranged adjacent said chucks and adapted to advance molds stepwise therebetween, means for reciprocating said transfer a periodically operating mold transfer located adjacent one end of said multiple seat transfer together with means for reciprocating the same, a mold conveyor associated with the other end of said multiple seat transfer, a mold conveyor associated with said periodically operated mold transfer and mechanism for operating said conveyors, and said transfers in timed relation.

20. A machine for manufacturing jiggered pottery in or on molds comprising a mechanism for feeding clay, a mechanism for jiggering clay, means for conveying molds to said feeding and jiggering means thereby characterized that said conveying means is adapted to be filled with molds by hand and that the molds may be disposed in irregularly spaced relation, abutting relation or regularly spaced relation, together with periodically operating means for transferring molds one at a time from the said conveying means to the feeding means and the synchronized conveying means whereon filled molds are accumulated.

21. A machine for manufacturing jiggered pottery comprising a clay feeding mechanism and a clay jiggering mechanism, means for conveying molds in irregularly spaced relation, abutting relation or regularly spaced relation to a position adjacent the clay feeding mechanism, means for periodically transferring the aforesaid molds one at a time from the conveying means to the clay feeding mechanism, means for travelling said mold conveying means a distance equal to more than the center to center spacing of abutting molds to insure the seating of molds in said means for periodically transferring molds in the event of spacing between said molds, a mold conveying mechanism arranged adjacent said jiggering means and means for transferring molds from said jiggering means to said last named conveying means whereon filled molds are accumulated.

22. A machine for manufacturing jiggered pottery having, in combination, an endless conveyor for conveying molds in abutting or spaced relation in single file to a position adjacent a mold transfer point, a mechanism for feeding clay to the molds and a mechanism for jiggering the clay after it is applied to the molds, periodically operating means for transferring the aforesaid molds one at a time from the conveying means to the clay feeding mechanism and then to the jiggering mechanism and to a point of deposit, a further conveying mechanism forming the point of deposit whereon the filled molds are accumulated, all of the mold transferring and fabricating operations being automatically performed during the normal running of the machine but the molds being placed on and removed from the machine by hand.

23. The method of fabricating potteryware which comprises forming a billet of clay containing a multiple of mold charges, slicing the billet across the long axis and depositing the slice directly onto the ware forming surface of a mold, pressing the slice to spread the same over the ware forming surface of the mold and adhesively bond the same theerto, jiggering the clay and trimming the brim of excess material.

24. A system for the manufacture of formed, dried pottery ware on absorbent molds from plastic clay which comprises, manually transporting empty molds from a dryer to a zone of mold accumulation and accumulating a reserve supply of empty molds thereat, removing accumulated molds one at a time from the accumulated reserve supply and filling the molds with clay and then accumulating the filled molds and manually returning said molds from said zone of filled mold accumulation to the dryer.

25. In the manufacture of pottery ware, the method of manufacturing jiggered pottery ware which consists in manually accumulating a plurality of empty molds adjacent a feeding zone, charging the molds with clay, automatically conveying the charged molds to an automatic jiggering mechanism, jiggering the clay, accumulating molds filled with jiggered clay at another zone and manually transporting filled molds from the second named zone to a dryer and transporting empty molds from the dryer to the first named zone of mold accumulation.

WILLIAM J. MILLER.